United States Patent
Ricker et al.

Patent Number: 5,871,270
Date of Patent: Feb. 16, 1999

[54] TRUCK CONTAINER LIGHT BAR

[76] Inventors: John David Ricker; Kim S. Ricker, both of 1083 Grand Ave., Oroville, Calif. 95965

[21] Appl. No.: 648,513

[22] Filed: May 13, 1996

[51] Int. Cl.$^6$ .................................................. B60Q 1/00
[52] U.S. Cl. ........................ 362/80; 362/250; 362/396
[58] Field of Search ............................. 362/80, 82, 61, 362/250, 396, 251; 340/341

[56] References Cited

U.S. PATENT DOCUMENTS

| D. 295,447 | 4/1988 | Jones | D26/35 |
|---|---|---|---|
| D. 347,902 | 6/1994 | Stutts | D26/35 |
| 3,083,292 | 3/1963 | Roe et al. | 362/250 |
| 3,278,741 | 10/1966 | Wood | 362/80 |
| 4,928,216 | 5/1990 | Carr | 362/250 |
| 4,937,711 | 6/1990 | Shuen | 362/396 |
| 5,157,591 | 10/1992 | Chudzik | 362/80 |
| 5,481,441 | 1/1996 | Stevens | 362/250 |

Primary Examiner—James C. Yeung

[57] ABSTRACT

A new and improved truck container light bar adapted for use in association with a truck having an electrical system and a truck container having a rear section including tie down holes, the apparatus comprising, in combination: a first cross bar and a second cross bar each including an open inboard end and an outboard end formed in an inverted L-shaped configuration, each crossbar including at least one hole extending therethrough, at least one brake light and at least one signal light being coupled to each cross bar, each signal light and brake light including a lead wire extending therefrom and positioned through each crossbar, a central adjustment bar including a plurality of apertures and a plurality of small running lights, the running lights having lead wires extending through the central adjustment bar, the central adjustment bar being coupled within the open inboard ends of the crossbars with a cooperatively coupled bolt, an electrical extension cord being operatively coupled to each light and including a plug adapted to be coupled to the electrical system of a truck.

2 Claims, 3 Drawing Sheets

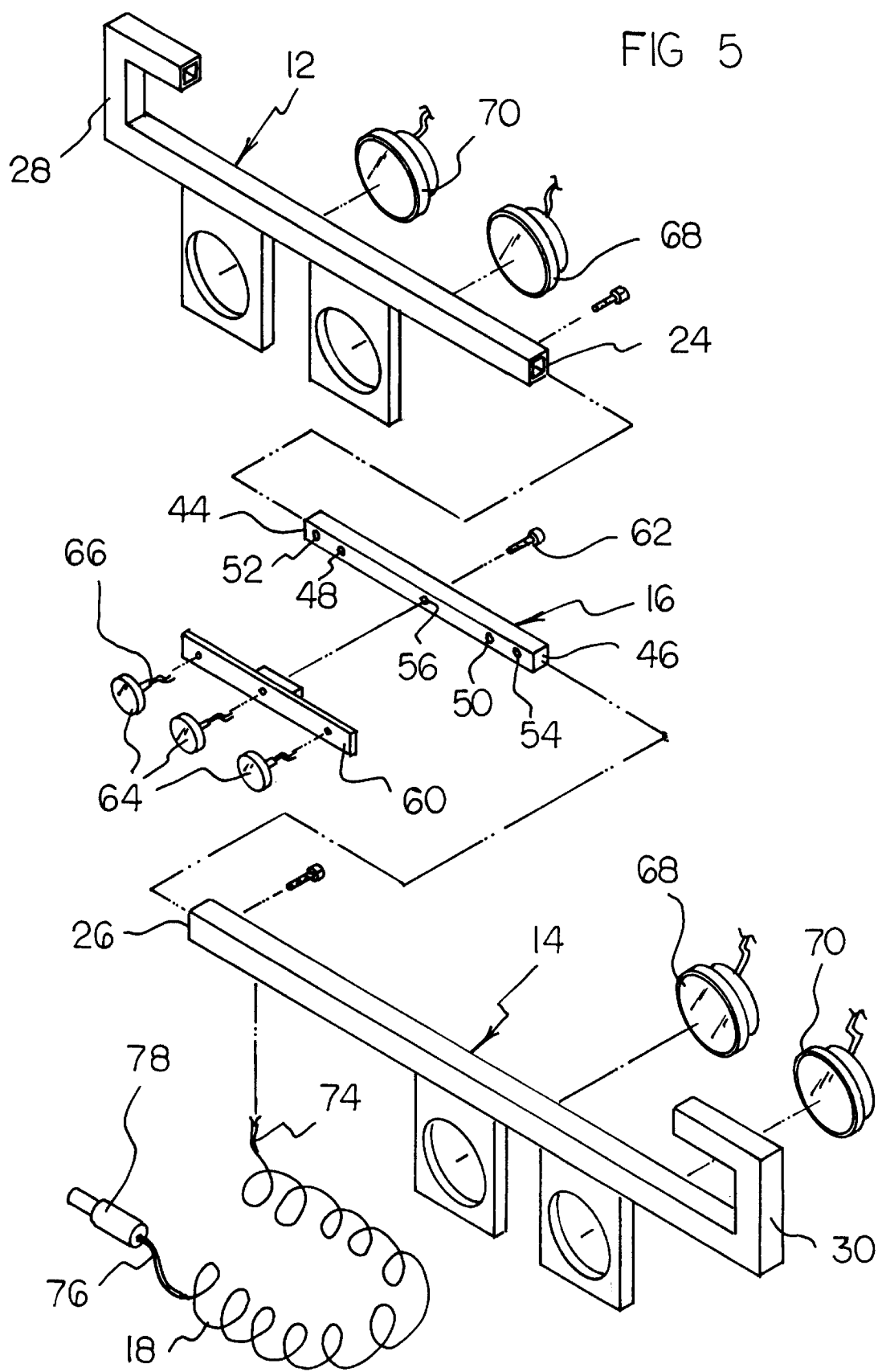

5,871,270

TRUCK CONTAINER LIGHT BAR

BACKGROUND OF THE INVENTION

1. Field of the Invention

The present invention relates to a truck container light bar and more particularly pertains to releasably coupling the apparatus to the tie down holes of a truck container to provide the necessary safety lighting to comply with state and federal traffic laws.

2. Description of the Prior Art

The use of vehicle lighting systems is known in the prior art. More specifically, vehicle lighting systems heretofore devised and utilized for the purpose of providing additional lighting for various types of vehicles are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,152,599 to Lewis a contact strip lighting system.

U.S. Pat. No. 5,184,960 to Hopkins discloses a trailer light connection system.

U.S. Pat. No. Des. 295,447 to Jones discloses a light bar for the rear of a truck.

U.S. Pat. No. 5,209,559 to Ruppel discloses a trailer light system.

U.S. Pat. No. 5,157,591 to Chudzik discloses an attachable auxiliary vehicle lighting system.

Lastly, U.S. Pat. No. Des. 347,902 to Stutts discloses an adjustable truck light bar.

In this respect, the truck container light bar according to the present invention substantially departs from the conventional concepts and designs of the prior art, and in doing so provides an apparatus primarily developed for the purpose of releasably coupling the apparatus to the tie down holes of a truck container to provide the necessary safety lighting to comply with state and federal traffic laws.

Therefore, it can be appreciated that there exists a continuing need for a new and improved truck container light bar which can be used for releasably coupling the apparatus to the tie down holes of a truck container to provide the necessary safety lighting to comply with state and federal traffic laws. In this regard, the present invention substantially fulfills this need.

SUMMARY OF THE INVENTION

In view of the foregoing disadvantages inherent in the known types of vehicle lighting systems now present in the prior art, the present invention provides an improved truck container light bar. As such, the general purpose of the present invention, which will be described subsequently in greater detail, is to provide a new and improved truck container light bar and method which has all the advantages of the prior art and none of the disadvantages.

To attain this, the present invention essentially comprises a new and improved truck container light bar adapted for use in association with a truck having an electrical system and a truck container having a rear section including tie down holes, the apparatus comprising, in combination: a first cross bar and a second cross bar, each cross bar being fabricated of hollow square steel tubing and including an inboard end and an outboard end, the outboard end of each cross bar being formed in an inverted L-shaped configuration, each cross bar having a front face and a rear face, the rear face of each crossbar including at least one hole extending therethrough, each crossbar having a bottom face including a signal light holder and a brake light holder extending therefrom, each holder including a large circular aperture extending therethrough; a central adjustment bar formed in a hollow elongated rectangular configuration with a first end, a second end, a center point, a front face and a rear face, each end including an inner and an outer aperture extending through the front and rear faces, the center point also including an central aperture extending therethrough, a base member formed in a generally planar rectangular configuration with two end holes and a central hole, the base member adapted to be coupled to the central adjustment bar with a bolt positioned through the central hole and central aperture, the end apertures of the base member being positioned in alignment with the inner apertures of the central adjustment bar, three small running lights including lead wires being coupled through the aligned apertures of the base member and central adjustment bar, the lead wires extending through the central adjustment bar; and a large generally cylindrical shaped brake light being coupled within each brake light holder, a large generally cylindrical shaped signal light being coupled within each signal light holder, each signal light and brake light including a lead wire extending therefrom and positioned through the hollow interior of the crossbar, in an operative orientation the first end of the central adjustment bar being positioned within the open inboard end of the first crossbar and coupled in place with a bolt, the second end of the adjustment bar being positioned within the second crossbar and coupled in place by a bolt, the second crossbar including a coiled electrical extension cord with a first end and a second end, the first end being positioned within the hollow interior of the second crossbar and operatively coupled to the lead wires of each signal light, brake light and running light, the second end of the extension cord including a plug adapted to be coupled to the electrical system of a truck.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck container light bar which has all of the advantages of the prior art vehicle lighting systems and none of the disadvantages.

It is another object of the present invention to provide a new and improved truck container light bar which may be easily and efficiently manufactured and marketed.

It is further object of the present invention to provide a new and improved truck container light bar which is of durable and reliable constructions.

An even further object of the present invention is to provide a new and improved truck container light bar which is susceptible of a low cost of manufacture with regard to both materials and labor, and which accordingly is then susceptible of low prices of sale to the consuming public, thereby making such truck container light bar economically available to the buying public.

Still yet another object of the present invention is to provide a new and improved truck container light bar which provides in the apparatuses and methods of the prior art some of the advantages thereof, while simultaneously overcoming some of the disadvantages normally associated therewith.

Still another object of the present invention is to releasably couple the apparatus to the tie down holes of a truck container to provide the necessary safety lighting to comply with state and federal traffic laws.

Lastly, it is an object of the present invention to provide a new and improved truck container light bar adapted for use in association with a truck having an electrical system and a truck container having a rear section including tie down holes, the apparatus comprising, in combination: a first cross bar and a second cross bar each including an open inboard end and an outboard end formed in an inverted L-shaped configuration, each crossbar including at least one hole extending therethrough, at least one brake light and at least one signal light being coupled to each cross bar, each signal light and brake light including a lead wire extending therefrom and positioned through each crossbar, a central adjustment bar including a plurality of apertures and a plurality of small running lights, the running lights having lead wires extending through the central adjustment bar, the central adjustment bar being coupled within the open inboard ends of the crossbars with a cooperatively coupled bolt, an electrical extension cord being operatively coupled to each light and including a plug adapted to be coupled to the electrical system of a truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an exploded perspective view of the apparatus illustrating the positioning of the various components with respect to each other.

The same reference numerals refer to the same parts through the various Figures.

DESCRIPTION OF THE PREFERRED EMBODIMENT

Figure 1:
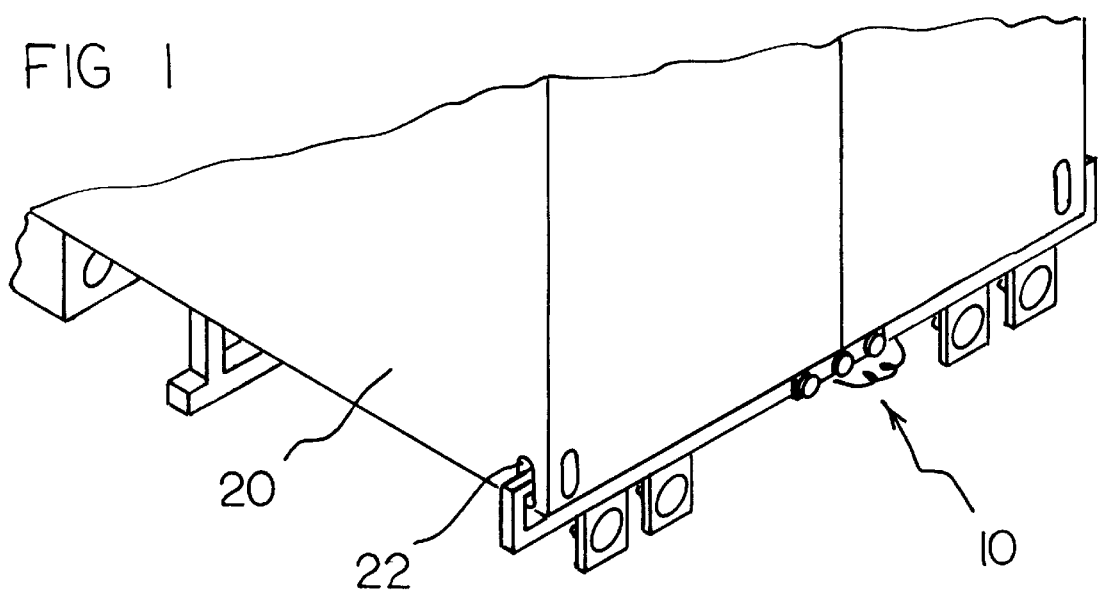
FIG. 1 is a perspective view of the preferred embodiment of the truck container light bar constructed in accordance with the principles of the present invention.

With reference now to the drawings, and in particular to FIG. 1 thereof, the preferred embodiment of the new and improved truck container light bar embodying the principles and concepts of the present invention and generally designated by the reference numeral 10 will be described.

The present invention, the truck container light bar 10 is comprised of a plurality of components. Such components in their broadest context include a first cross bar 12, a second cross bar 14, a central adjustment bar 16 and a coiled electrical extension cord 18. Such components are individually configured and correlated with respect to each other so as to attain the desired objective.

The truck container light bar 10 is adapted for use in association with a truck having an electrical system and a truck container 20 having a rear section including tie down holes 22. The preferred embodiment of the apparatus is designed for eight foot wide truck containers. The tie down holes are formed in the sides of the truck container. The truck containers are utilized to store goods to be transported in a truck. Note FIG. 1.

Figure 2:
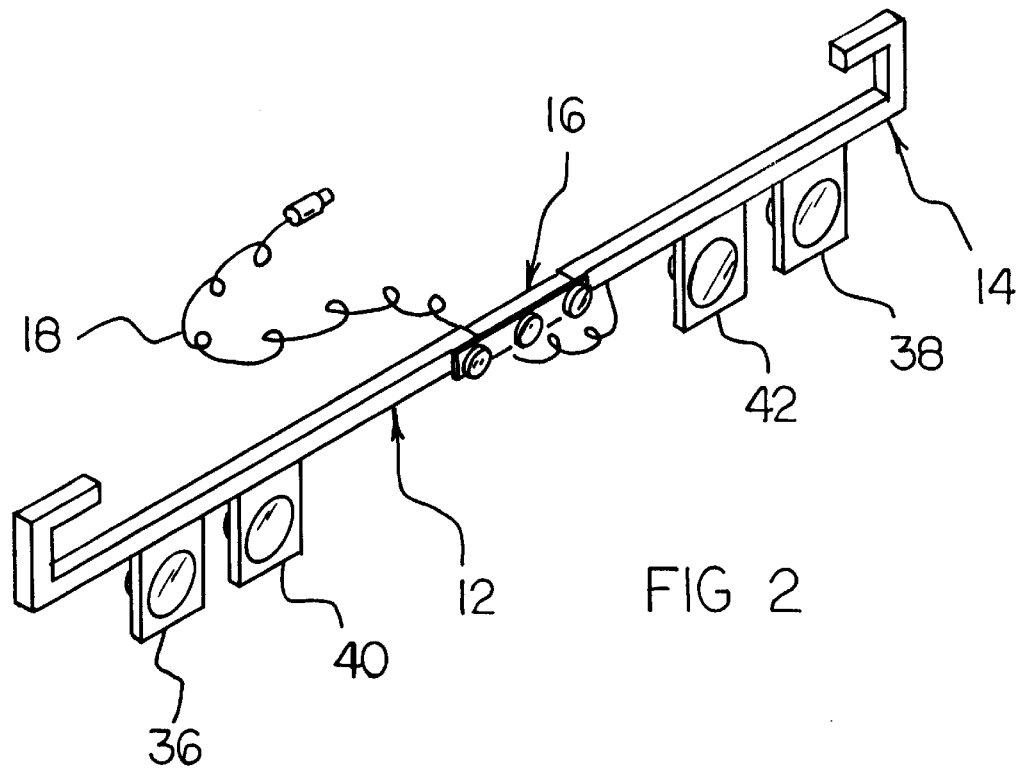
FIG. 2 is a perspective view of the apparatus shown in an orientation detached from a truck container.

More specifically, the apparatus includes a first cross bar 12 and a second bar 14. Each cross bar is fabricated of hollow, square, three inch steel tubing and includes an inboard end 24, 26 and an outboard end 28, 30. The length of each cross bar is about four feet. The outboard end of each cross bar is formed in an inverted L-shaped configuration with a height of about one foot. The L-shaped outboard ends are adapted to be coupled within the tie down holes of a truck container when assembling the apparatus. The apparatus is easily disconnected from the truck container by simply removing the bolts from the first and second cross bars. The disconnectable construction of the apparatus permits easy storage when not in use, thereby preventing theft. Note FIGS. 1 and 2.

Figure 3:
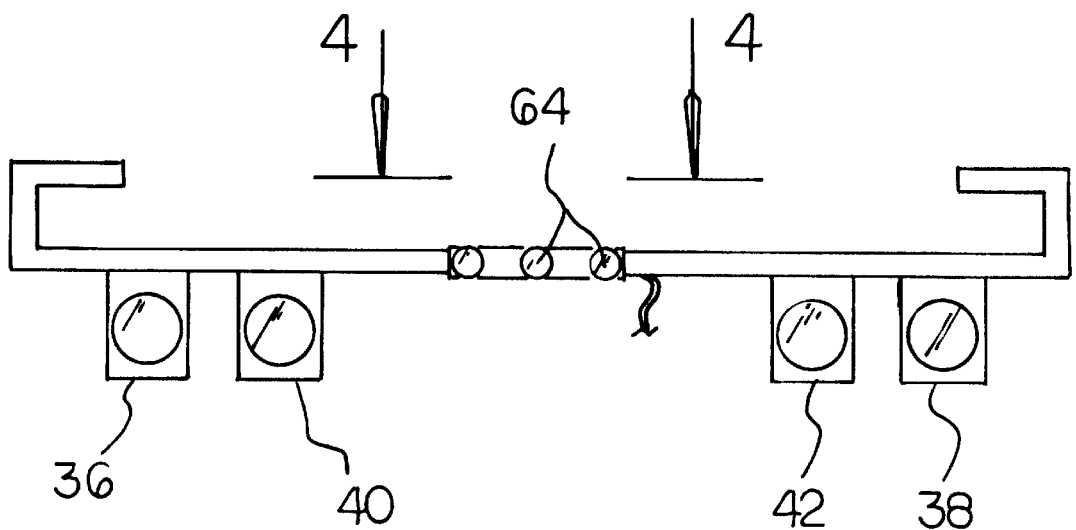
FIG. 3 is a front elevational view of the apparatus illustrating the signal lights, brake lights and running lights of the apparatus.

Each cross bar has a front face and a rear face. The rear face of each crossbar includes at least one hole 32, 34 extending through it. Each crossbar has a bottom face which includes a signal light holder 36, 38 and a brake light holder 40, 42 extending from it. Each holder is formed in a planar generally rectangular configuration with a large circular aperture extending through it. The apertures are appropriately sized and shaped to retain a brake light or signal light within it. Note FIGS. 3 and 5.

Figure 4:
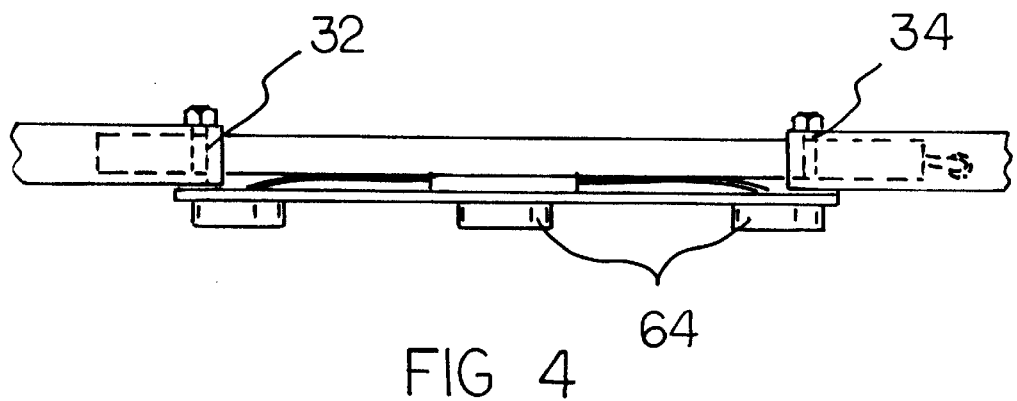
FIG. 4 is a top perspective view of the apparatus taken along section line 4—4 of FIG. 3.

A central adjustment bar 16 is formed in a hollow elongated rectangular configuration with a first end 44, a second end 46, a center point, a front face and a rear face. The central adjustment bar is about one half the length of each cross bar. The central adjustment bar has a smaller width than the cross bars to permit placement within the hollow interior of the cross bars. Each end includes an inner aperture 48, 50 and an outer aperture 52, 54 extending through the front and rear faces. The center point also includes an central aperture 56 extending through it. In an operative orientation the first end of the central adjustment bar is positioned within the open inboard end of the first crossbar. The outer aperture 54 is then aligned with the aperture in the first cross bar and coupled in place with a bolt. Likewise, the second end of the adjustment bar is positioned within the open inboard end of the second crossbar and coupled in place by a bolt. Note FIG. 4.

A base member 60 is formed in a generally planar rectangular configuration with two end holes and a central hole extending through it. The base member is adapted to be coupled to the front face of the central adjustment bar. A bolt 62 is positioned through the central hole of the base member and central aperture of the central adjustment bar. In the coupled orientation the end apertures are positioned in alignment with the inner aperture of the central adjustment bar. Three small running lights 64 each include lead wires 66 and are coupled through the aligned apertures of the base member and central adjustment bar. The lights are generally cylindrical in shape and smaller than the signal and brake lights. The running lights have red colored covers in the preferred embodiment. The lead wires extend through the central adjustment bar in an assembled orientation. The lead wires are operatively coupled to the coiled extension cord. The cord is coupled to the lighting system of the truck in an operative orientation, thereby providing a source of electrical potential to illuminate the running lights. Note FIGS. 3–5.

A large generally cylindrical shaped brake light 68 is coupled within the aperture of each brake light holder. A large generally cylindrical shaped signal light 70 is coupled within the aperture of each signal light holder. The brake and signal lights have differently colored covers in varying embodiments of the apparatus. Each signal light and brake light include a lead wire extending from it and positioned through the hollow interior of the crossbar. The lead wires are operatively coupled to the coiled extension cord. The cord is coupled to the lighting system of the truck in an operative orientation, thereby providing a source of electrical potential to illuminate the lights. Note FIGS. 3–5.

The second crossbar includes a coiled electrical extension cord 18 with a first end 74 and a second end 76. The first end is positioned within the hollow interior of the second crossbar and is operatively coupled to the lead wires of each signal light, brake light, and running light. The second end of the extension cord includes a plug 78 adapted to be coupled to the electrical system of a truck. The coiled configuration of the cord permits flexible extension ranging between five and forty feet. Note FIGS. 2 and 5.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved truck container light bar adapted for use in association with a truck having an electrical system and a truck container having a rear section including tie down holes, the apparatus comprising, in combination:

a first cross bar and a second cross bar, each cross bar being fabricated of hollow square steel tubing and including an inboard end and an outboard end, the outboard end of each cross bar being formed in an inverted L-shaped configuration, each cross bar having a front face and a rear face, the rear face of each crossbar including at least one hole extending therethrough, each crossbar having a bottom face including a signal light holder and a brake light holder extending therefrom, each holder including a large circular aperture extending therethrough;

a central adjustment bar formed in a hollow elongated rectangular configuration with a first end, a second end, a center point, a front face and a rear face, each end including an inner and an outer aperture extending through the front and rear faces, the center point also including an central aperture extending therethrough, a base member formed in a generally planar rectangular configuration with two end holes and a central hole, the base member adapted to be coupled to the central adjustment bar with a bolt positioned through the central hole and central aperture, the end apertures of the base member being positioned in alignment with the inner apertures of the central adjustment bar, three small running lights including lead wires being coupled through the aligned apertures of the base member and central adjustment bar, the lead wires extending through the central adjustment bar; and a large generally cylindrical shaped brake light being coupled within each brake light holder, a large generally cylindrical shaped signal light being coupled within each signal light holder, each signal light and brake light including a lead wire extending therefrom and positioned through the hollow interior of the crossbar, in an operative orientation the first end of the central adjustment bar being positioned within the open inboard end of the first crossbar and coupled in place with a bolt, the second end of the adjustment bar being positioned within the second crossbar and coupled in place by a bolt, the second crossbar including a coiled electrical extension cord with a first end and a second end, the first end being positioned within the hollow interior of the second crossbar and operatively coupled to the lead wires of each signal light, brake light and running light, the second end of the extension cord including a plug adapted to be coupled to the electrical system of a truck.

2. A new and improved truck container light bar adapted for use in association with a truck having an electrical system and a truck container having a rear section including tie down holes, the apparatus comprising, in combination:

a first cross bar and a second cross bar each including an open inboard end and an outboard end formed in an inverted L-shaped configuration, each crossbar including at least one hole extending therethrough, at least one brake light and at least one signal light being coupled to each cross bar, each signal light and brake light including a lead wire extending therefrom and positioned through each crossbar, a central adjustment bar including a plurality of apertures and three small running lights, each running light being formed in a generally cylindrical configuration, the running lights having lead wires extending through the central adjustment bar, the central adjustment bar being coupled within the open inboard ends of the crossbars with a cooperatively coupled bolt, the first cross bar, second cross bar and central adjustment bar each being fabricated of steel, each cross bar including at least one generally rectangular shaped brake light holder and at least one generally rectangular shaped signal light holder affixed thereto, each holder including an aperture extending therethrough, each brake light holder supporting a brake light within the aperture, each signal light holder supporting a signal light within the aperture; and a electrical extension cord with a first end positioned within the hollow interior of the second crossbar and operatively coupled to the lead wires of each signal light, brake light and running light, the cord having a second end including a plug adapted to be coupled to the electrical system of a truck, the electrical extension cord being formed in a coiled configuration.

* * * * *